(12) United States Patent
Kienzl et al.

(10) Patent No.: US 8,448,930 B2
(45) Date of Patent: May 28, 2013

(54) PALLET SYSTEM COMPRISING A SETUP PALLET AND A SETUP PALLET RECEPTACLE

(75) Inventors: Franz Kienzl, Graz (AT); Martin Wetzel, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 13/347,308

(22) Filed: Jan. 10, 2012

(65) Prior Publication Data
US 2012/0205851 A1    Aug. 16, 2012

(30) Foreign Application Priority Data

Jan. 13, 2011  (AT) .................................. GM16/2011

(51) Int. Cl.
| | | |
|---|---|---|
| B23Q 1/64 | (2006.01) |
| G01M 15/00 | (2006.01) |
| B65G 47/84 | (2006.01) |
| B65G 29/00 | (2006.01) |
| B65G 49/00 | (2006.01) |
| B65G 37/00 | (2006.01) |
| B65G 43/00 | (2006.01) |
| B65G 43/08 | (2006.01) |
| B65G 49/02 | (2006.01) |
| G01M 15/02 | (2006.01) |

(52) U.S. Cl.
USPC ..... 269/56; 73/116.02; 198/465.1; 198/346.1

(58) Field of Classification Search
USPC ........... 269/56; 73/116.02; 198/465.1, 346.1, 198/345.3
See application file for complete search history.

(56) References Cited

U.S. PATENT DOCUMENTS

| | | | | |
|---|---|---|---|---|
| 3,834,221 | A | * | 9/1974 | Swis et al. ................. 73/116.02 |
| 4,253,559 | A | * | 3/1981 | Myers et al. ............... 198/345.3 |
| 4,285,233 | A | * | 8/1981 | Swis .......................... 73/116.02 |
| 4,533,034 | A | * | 8/1985 | Gregg ........................ 198/465.1 |
| 4,602,499 | A | * | 7/1986 | Norton et al. ..................... 73/41 |
| 4,890,371 | A | * | 1/1990 | Camloh et al. ................ 29/33 P |
| 4,932,628 | A | * | 6/1990 | Pacheco ....................... 248/676 |
| 4,941,347 | A | | 7/1990 | Iijima et al. |
| 5,099,981 | A | * | 3/1992 | Guzzoni .................... 198/346.1 |
| 5,509,301 | A | * | 4/1996 | Takano et al. ............. 73/116.02 |
| 5,629,476 | A | | 5/1997 | Sondey |
| 6,253,600 | B1 | * | 7/2001 | Sondey ..................... 73/116.02 |
| 6,591,665 | B2 | * | 7/2003 | Sondey ..................... 73/116.02 |
| 7,621,031 | B2 | * | 11/2009 | Kawai et al. ................. 29/33 P |
| 7,954,366 | B2 | * | 6/2011 | Gushman et al. .......... 73/116.01 |

FOREIGN PATENT DOCUMENTS

EP    1484591    4/2004

OTHER PUBLICATIONS

English Abstract of EP1484591.

* cited by examiner

*Primary Examiner* — Lee D Wilson
*Assistant Examiner* — Alvin Grant
(74) *Attorney, Agent, or Firm* — Dykema Gossett PLLC

(57) ABSTRACT

A pallet system with a setup pallet (3) for receiving a test component (70) and with a setup pallet receptacle (4) includes a pallet docking plate (64) with a number of pallet media connections (65, 66) on the setup pallet (3), and a receptacle docking unit (10) having a receptacle docking plate (20) with a number of matching receptacle media connections (30, 32) on the setup pallet receptacle (4). The pallet docking plate (64) and/or the receptacle docking plate (20) are/is arranged movably and a movable docking plate (20, 64) can be fed toward the other docking plate (64, 20).

10 Claims, 6 Drawing Sheets

PALLET SYSTEM COMPRISING A SETUP PALLET AND A SETUP PALLET RECEPTACLE

The present invention relates to a pallet system with a setup pallet for receiving a test component and a with a setup pallet receptacle, wherein a holding device for holding the setup pallet is provided at the setup pallet receptacle, and an associated fixture for engaging the holding device is provided at the setup pallet, and wherein a receptacle-positioning device is provided at the setup pallet receptacle and a pallet-positioning device is provided at the setup pallet, which positioning devices interact for a correct positioning of the setup pallet in the setup pallet receptacle, and to the use of such a pallet system in a test stand.

For increasing the productivity of the test stand operation for testing internal combustion engines, transmissions or drive trains, it is known to assemble and preset the test component offside the test stand on setup pallets and to subsequently bring the test component on the setup pallets into the test stand. Thereby, necessary setup times no longer reduce the testing times on the test stand because setup work can already be carried out offside the test stand and independently of the test stand operation. Such setup pallets are known, e.g., from EP 1 484 591 A1 or WO 00/60329 A1 and show a pallet construction on which the test component is arranged and preset. The pallet construction can be designed to be self-propelled on wheels or rollers, but can also be designed to be not self-propelled, wherein in the latter case, the pallet can be moved, e.g., by means of forklifts or other suitable transport means such as, e.g., self-propelled transport vehicles. The process of a preliminary setup can comprise arranging measuring systems, such as e.g. sensors, on the test component, connecting the measuring systems arranged on the test component to evaluation units on the pallet, filling the test component with media, such as e.g. lubricating oil, and/or connecting media connections (e.g. for cooling water, fuel, air, etc.) on the pallet to the corresponding connections on the test component. When placing the test component into the test stand, or thereafter, the media connections can be connected to the corresponding media supplies in the test stand and the test component can be connected to the drive and load machine (dynamometer or dyno), and the connection to the test stand control unit can be established, whereby the test component and the test stand are ready for operation. In this manner, the setup work necessary directly in the test stand can be reduced to a minimum. Moreover, the measuring system (e.g. also the ECU) can already be calibrated outside of the test stand or can be tested for correct function. With adequate equipment in the setup area, a pre-start or pre-test of the test component is also possible.

Of course, the test component or the setup pallet with the test component has to be exactly aligned with the dyno in the test stand so that drive shaft or output shaft of the test component can be arranged in alignment with the shaft of the dyno. For this, suitable receptacles for the test component are usually provided on the pallet construction. Likewise, suitable fixtures can be provided on the pallet construction and/or in the test stand by means of which fixtures, the pallet construction can be correctly positioned in the test stand. WO 96/33395 A1 shows a setup pallet and a test stand with devices for a simple and correct positioning of the setup pallet or the test component arranged thereon in the test stand. For this purpose, the setup pallet with the test component is moved into a receptacle in the test stand, wherein the setup pallet is prepositioned by a guide of the wheels and subsequently, a pin is pushed into a recess to ensure accurate positioning. After this, the setup pallet can be fixed in this position in the test stand by means of holding devices. However, this setup pallet requires that all necessary steps have to be carried out manually; e.g., the positioning device has to be manually activated and released again, the holding devices have to be manually clamped and released again, and the media supplies have to be manually connected to the corresponding media connections. All this increases of course the required time for changing over the test stand and thus shortens the testing time available.

From U.S. Pat. No. 4,941,347 A, a test stand in the form of a rotary table is known, wherein on the rotary table, in a number of test stations, in each case one test component arranged on a setup pallet can be received. In a section of the rotary table, a test station can be connected to media connections and certain test runs can be performed. However, such a test stand is inflexible because the cycle times of the rotational movement or the rotational speed has to be adapted to the individual test runs and therefore, a test component has possibly to stay longer than necessary in the test stand. Due to the different testing times, this can result in different usage rates of the individual test stations which results also in inefficiency of such a test stand.

It is therefore an object of the invention to provide a pallet system and a test stand for receiving a pallet system, which permit a quick and effective changeover and an efficient operation of the test stand.

This object is achieved according to the invention in that a docking plate with a number of pallet media connections is provided on the setup pallet, and a receptacle docking unit comprising a receptacle docking plate with a number of matching receptacle media connections is provided on the setup pallet receptacle, wherein the pallet docking plates and/or the receptacle docking plate are/is arranged movably and a movable docking plate can be fed toward the other docking plate and thus, with the pallet media connections engaging in the receptacle media connections, a media supply can be established, and the holding device, the receptacle positioning device and the receptacle docking plates can positioned independently of each other and relative to each other.

With this approach according to the invention, for arranging the setup pallet in the setup pallet receptacle and for establishing the necessary media supplies only small masses, namely the docking plate or the docking plates have to be moved and not, as previously, the setup pallet inclusive the test component and potential additional installations. Thereby, a very compact and energy-efficient design is obtained and furthermore, a quick changeover of the test stand is possible.

If the setup pallet receptacle is provided with a guide means for aligning the setup pallet, the setup pallet can be roughly prepositioned, which simplifies the final positioning of the setup pallet in the setup pallet receptacle or in the test stand.

The setup pallet can be fixed in a simple manner in the test stand if on the holding device, a base frame is provided on which a supporting arm is arranged in a pivotable and axially displaceable manner. Thus, the setup pallet can be securely and automatically positioned and fixed.

In order to position and fix the test component in a simple, quick and secure manner in the setup pallet receptacle or in the test stand, preferably, receiving means for holding and fixing the test component in the correct position are arranged on the setup pallet.

For processing the signals of the measuring system (sensors), it is also possible to provide on the setup pallet a signal conditioning unit which is connected via lines to the measuring system arranged on the test component. Thus, it is possible to fully preset the setup pallet in a setup area offside the test stand and to test the function of the setup pallet.

The setup process of the test pallet is considerably simplified if a positioning gauge is arranged on the setup pallet for aligning the test component on the setup pallet. Thus, the test component can be correctly positioned on the setup pallet in a very simple and quick manner.

In order to be able to test the test component and the function of the preset test pallet in the setup area in a simple manner, a fixation device which can be connected to the output flange of the test component can be provided on the setup pallet.

The present invention is described hereinafter with reference to the FIGS. 1 to 7 which show advantageous, non-limiting configurations of the invention.

In the figures

Figure 1:
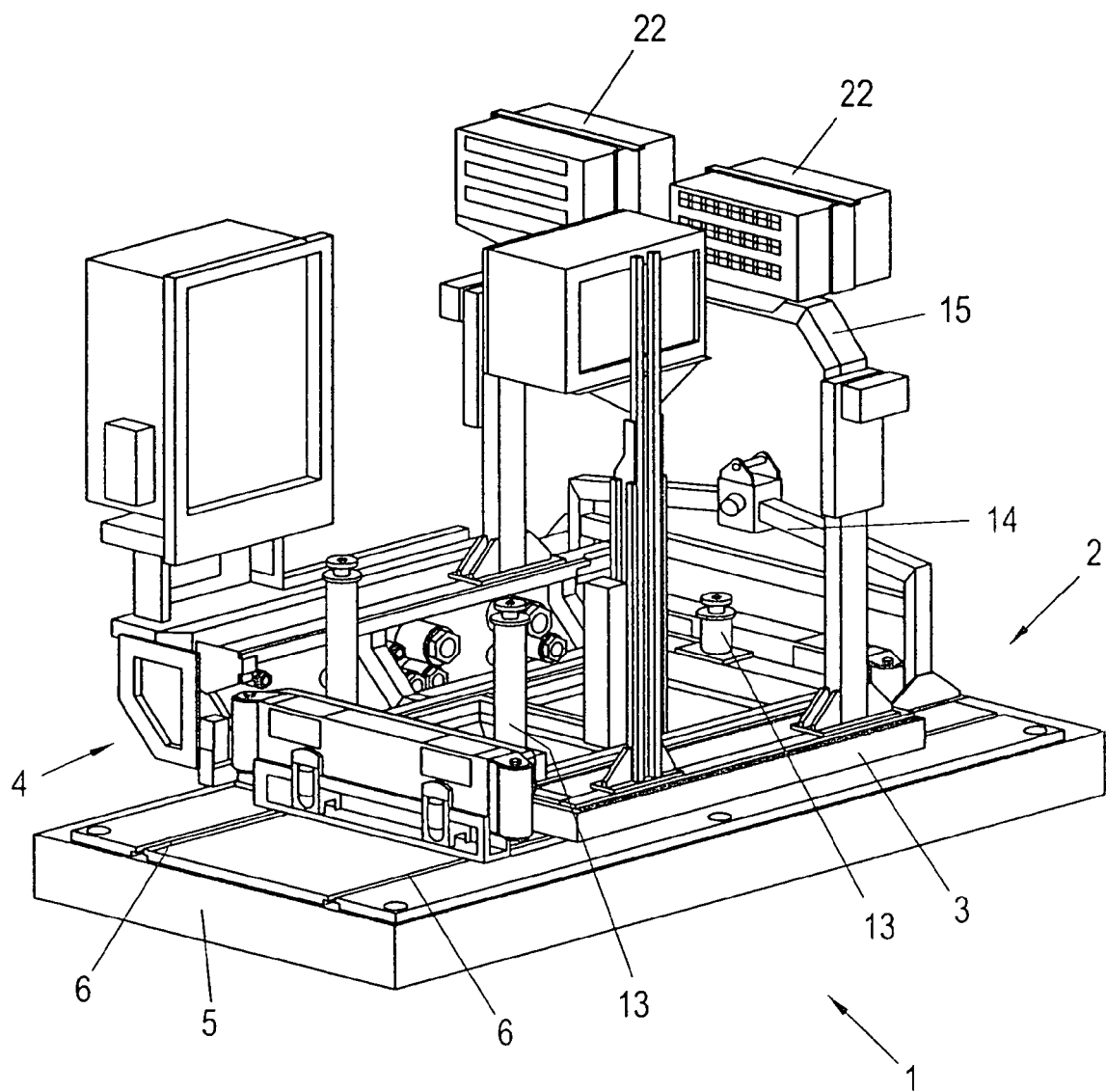
FIG. 1 shows the arrangement of pallet system in the test stand.

In FIG. 1, a portion of the test stand 1 with the pallet system 2 according to the invention is illustrated. Here, a setup pallet 3 is arranged in a setup pallet receptacle 4. The setup pallet receptacle 4 as well as the setup pallet 3 is arranged on a base plate 5 in the test stand 1.

The individual parts of the pallet system 2 are described below by means of the FIGS. 1 to 6. As in particular shown in FIG. 2, all individual parts of the pallet system 2 are modular separate units which can be arranged independently of one another and relative to one another, which significantly improves the flexibility and modularity of the structure of the pallet system 2.

Figure 3:
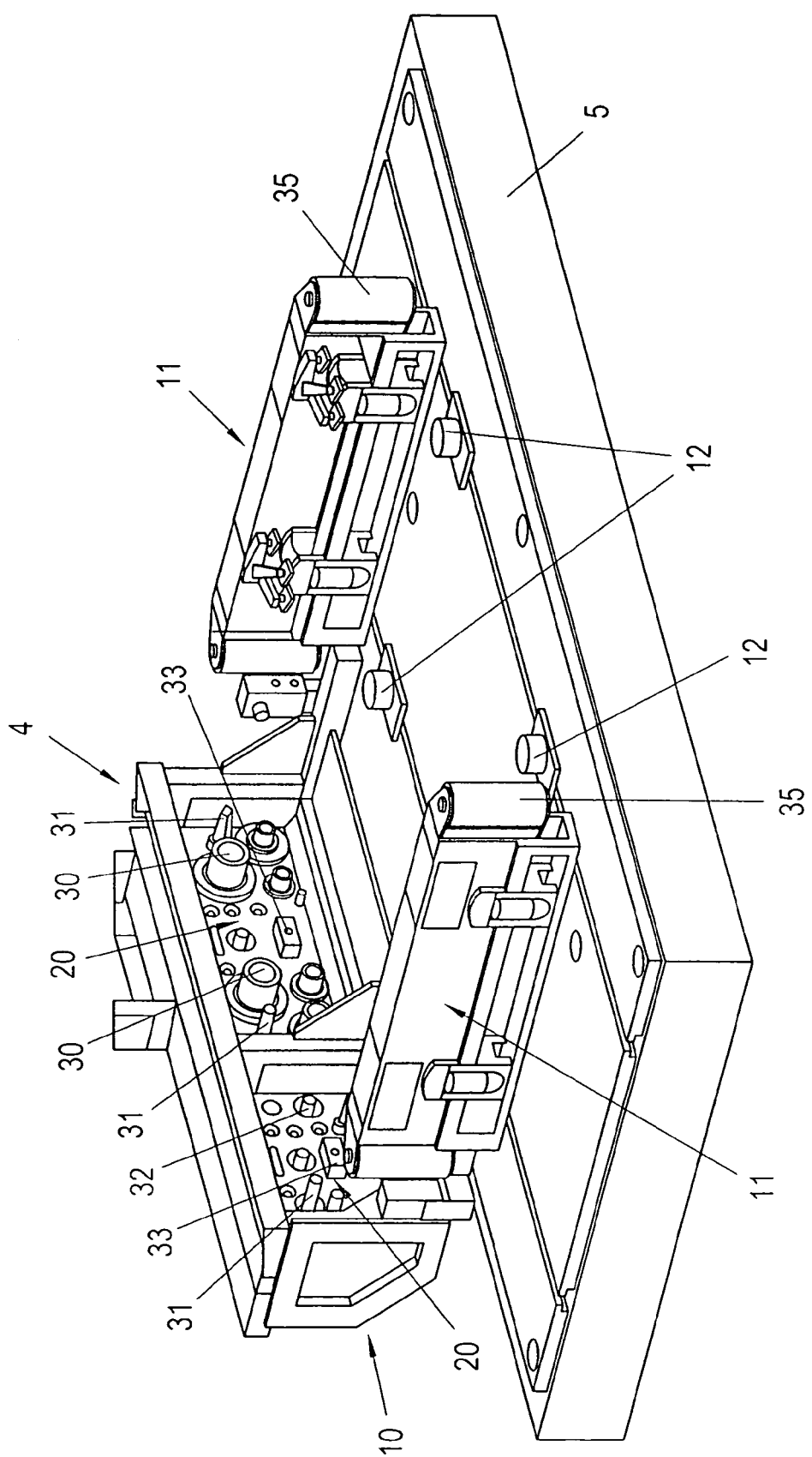
FIG. 3 shows a setup pallet receptacle of the pallet system.

FIG. 3 shows only the setup pallet receptacle 4 with the receptacle docking unit 10, a setup pallet holding device 11 for holding the setup pallet 3, and a receptacle positioning device 12 for aligning and holding the setup pallet 3 in the correct position in the test stand 1. All parts can be positioned and arranged independently of one another and relative to one another, e.g. in grooves 6, provided locating holes or other suitable features in the base plate 5. Thus, the setup pallet receptacle 4 can be adapted in a very simple manner to the different setup pallets 3 without the need to change the individual parts of the setup pallet receptacle 4.

On the receptacle docking unit 10 on the supply side, one or a plurality of receptacle docking plates 20 are arranged which can be movable relative to the receptacle docking unit or relative to the setup pallet receptacle 4. The receptacle docking plates 20 have different media connections 30, 32 and can also have receptacle locating means 31, e.g. positioning pins, and locking means 33. Furthermore, electrical connections can also be provided on the receptacle docking plates 20, e.g. for power supply or for a control bus, a data bus or signal lines.

The setup pallet receptacle 4, in this case, the setup pallet holding devices 11, is equipped with guide means 35, here rollers, for an approximate alignment of the setup pallet 3 in the setup pallet receptacle 4 or on the test stand 1 and also includes clamping means for automatically fixing the setup pallet 3 on the test stand 1, as will be described below.

Figure 4:
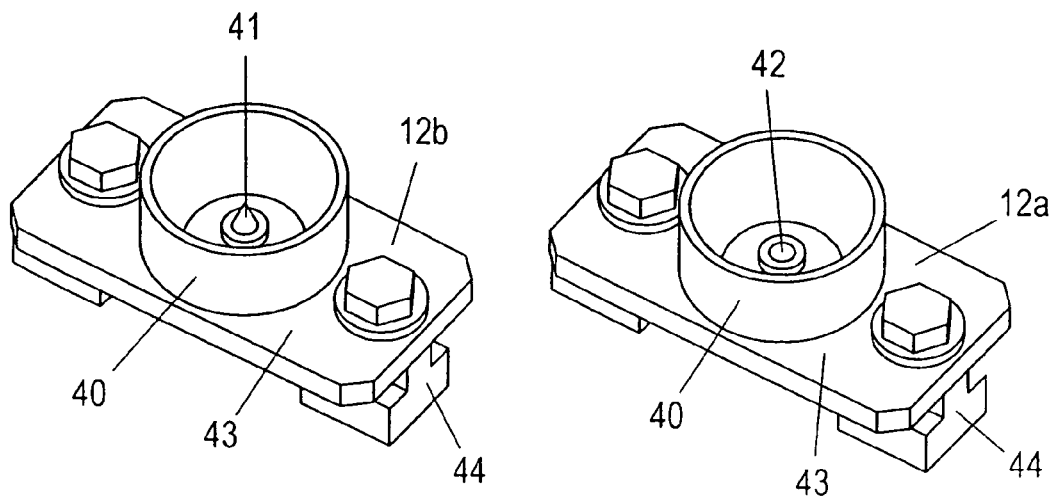
FIG. 4 shows a receptacle positioning device of the pallet system.

As a receptacle positioning device 12, FIG. 4, locating receptacles 40 having a tapered inner contour can be provided. At the bottom of the tapered inner contour, locating pins 41 or locating holes 42 can be provided for an exact alignment of the setup pallet 3 on the test stand 1. The inner contour serves, e.g., for a rough prepositioning and a simplified placement of the setup pallet 3 in the setup pallet receptacle 4. The exact alignment of the setup pallet 3 can be carried out by means of the locating pins 41 and the locating holes 42. The receptacle positioning devices 12a, 12b are arranged on plates 43, which can be displaced and arranged in the grooves of the base plate 5 via adequate means, e.g. clamping screws 44.

Figure 5:
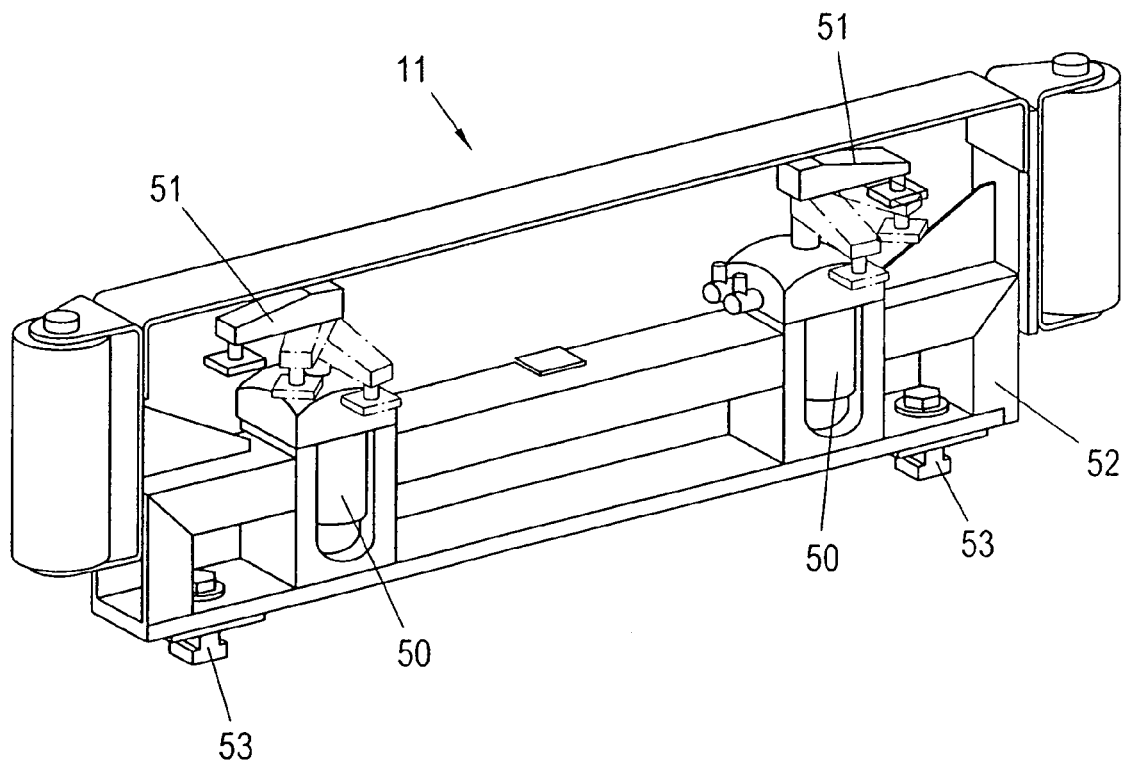
FIG. 5 shows a setup pallet holding device of the pallet system.

In the exemplary embodiment shown, the holding device 11 of the setup pallet receptacle 11, FIG. 5, comprises two hydraulic or pneumatic swivel cylinders 50 by means of which in each case one support arm 51 can be swiveled and axially displaced. For fixing the setup pallet 3, the support arm 51 is first swiveled toward the setup pallet 3 and subsequently, the support arm 51 is swiveled toward the setup pallet 3 until said support arm rests against the associated contact surface on the setup pallet 3 and thus clamps and fixes the latter. Of course, the holding device 11 can also comprise other means for fixing the setup pallet 3. The holding device 11 further comprises a base frame 52 which can be displaced and arranged in the grooves of the base plate 5 via adequate means, e.g. clamping screws 53. Preferably, two holding devices 11 are used in the setup pallet receptacle 4.

Figure 6:
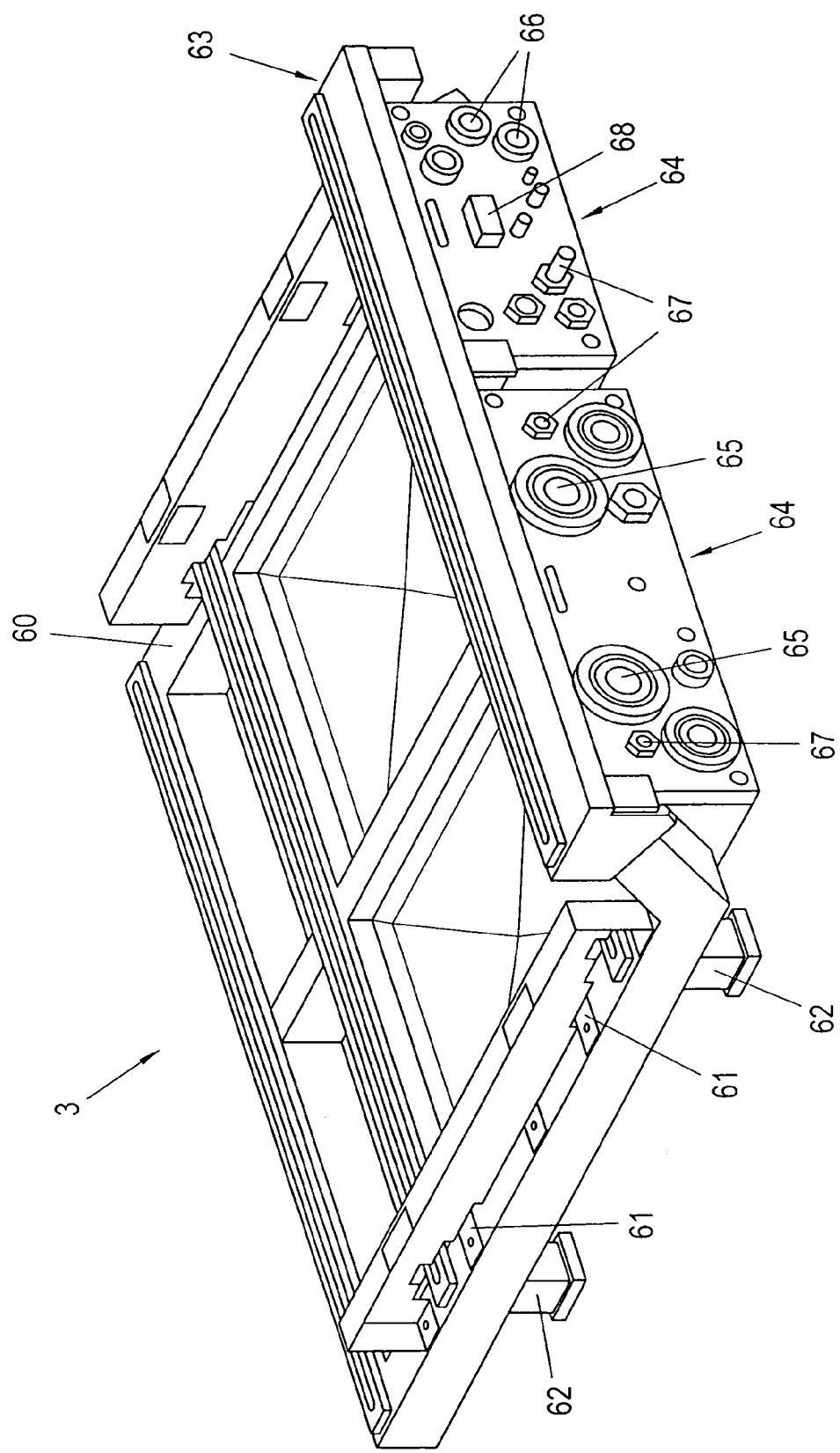
FIG. 6 shows a setup pallet of the pallet system.

In the exemplary embodiment shown, the setup pallet 3, FIG. 6, comprises a pallet frame 60 on which a fixture 61, in this case two, for engaging the holding device 11 of the setup pallet receptacle 4 is arranged. Here, the fixture 61 is a contact surface for the support arm 51 of the holding device 11. Furthermore, the pallet frame 60 is provided with pallet feet 62 which serve for depositing the pallet outside of the test stand 1. Furthermore, on the lower side of the pallet frame 60, pallet positioning devices are arranged which are not illustrated here and which have a matching counter shape with respect to the receptacle positioning devices 12 of the setup pallet receptacle 4. The setup pallet 3 is deposited by means of the pallet positioning devices in the receptacle positioning devices 12 and thus in the setup pallet receptacle 4. In this manner, the setup pallet 3 can be positioned exactly in the setup pallet receptacle 4 and thus in the test stand 1.

Furthermore, a pallet docking unit 63 with one or a plurality of pallet docking plates 64 is arranged on the setup pallet 3. For connecting to the receptacle docking plates 20 on the supply side, the pallet docking plate 64 has matching pallet media connections 65, 66 and/or electrical connections, and/or pallet positioning means 67, e.g. locating bushes, and/or locking mechanisms 68. The pallet docking plates 64 can be arranged to be movable relative to the pallet docking unit 63 or, respectively, the setup pallet 3.

For establishing the media supply, preferably, the receptacle docking plates 20 on the test stand side move toward the fixedly arranged pallet docking plates 64 of the setup pallet 3. However, this could also be the other way round, or both docking plates, the receptacle docking plates 20, and the pallet docking plates 64 could be moved.

Figure 2:
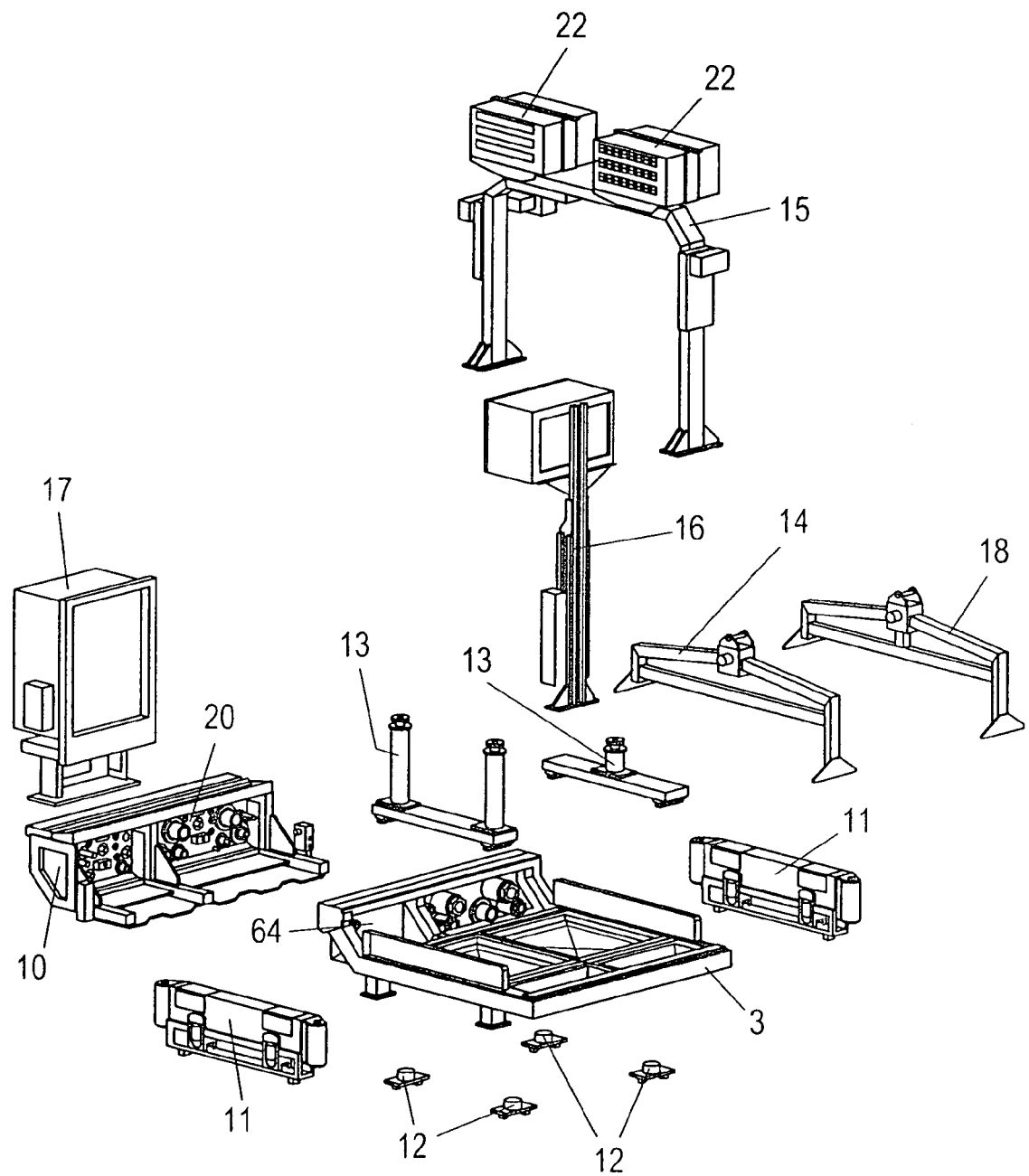
FIG. 2 shows an overview of the individual components of the pallet system.

Also, receiving means 13 for holding and fixing the test component 70 in the correct position can be arranged on the setup pallet 3, FIG. 2. Said receiving means 13 are advantageously arranged to be positioned independently of each other and relative to each other on the setup pallet 3 so as to be able to use the setup pallet 3 in a simple manner for different test components. These receiving means are preferably adjustable in all three spatial directions (X, Y, Z).

Figure 7:
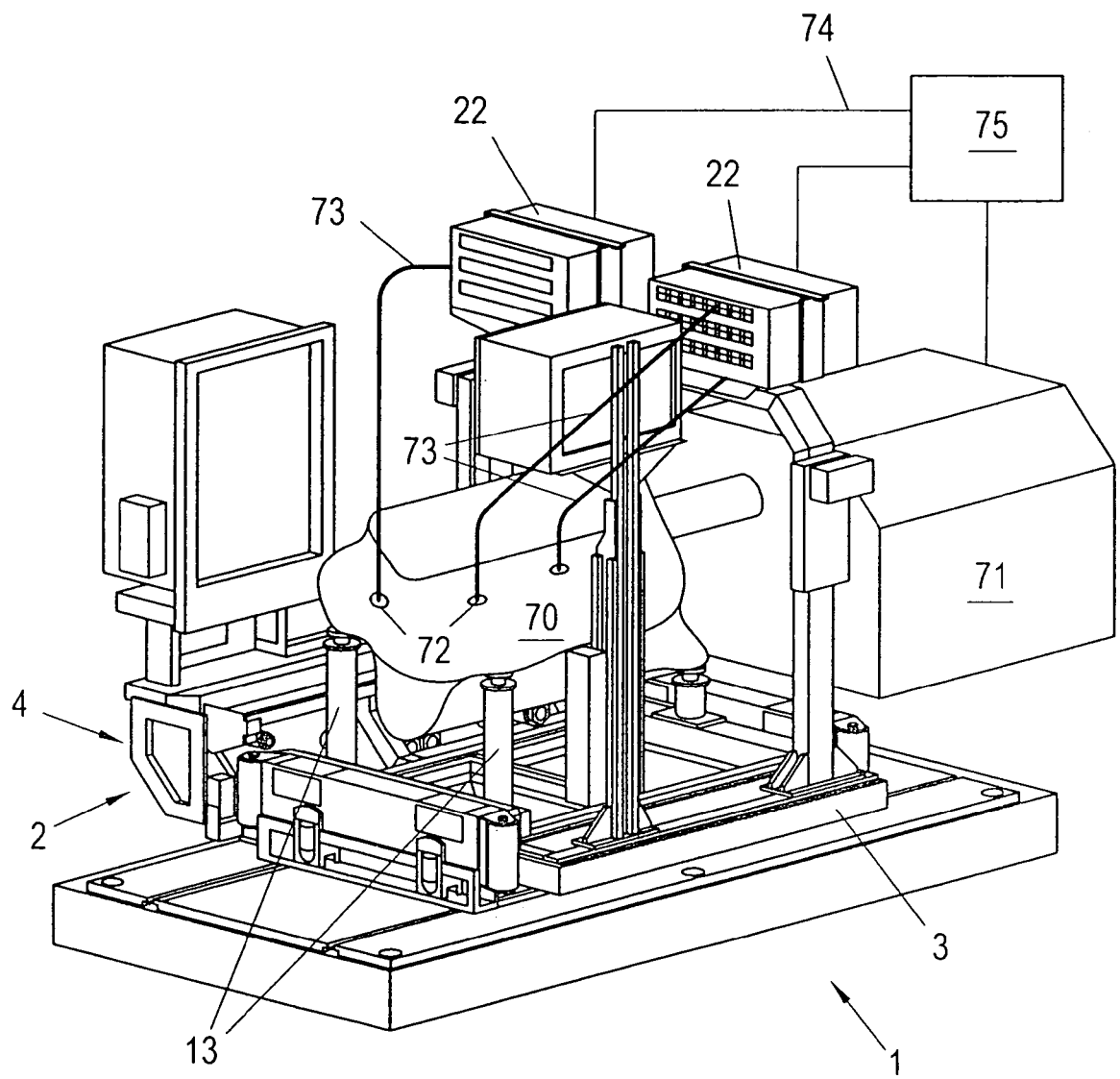
FIG. 7 shows a test stand with pallet system, test component and dynamometer.

Furthermore, signal conditioning units 22 can also be arranged on the setup pallet 3, e.g. on a portal frame 15 fastened to the setup pallet 3, FIG. 2. The measuring system arranged on the test component 70 is connected via adequate lines 73 to a signal conditioning unit 22, FIG. 7. From the signal conditioning unit 22, the sensor signals are transmitted, e.g. via bus lines 74, to the test stand control unit 75.

Furthermore, a connecting unit 16 can be provided, FIG. 2, which includes electrical components such as, e.g., a power supply for the test component, e.g. for the control unit of the test component or the starter motor of the test component, units for recording the crankshaft angle of the crankshaft of the test component, or for recording the ignition angle of the test component, electrical terminals, etc. The connecting unit 16 is also connected with adequate (not illustrated) electrical lines to the associated components on the test component 70 or the test stand.

Also, a control cabinet 17 can be arranged, FIG. 2, which can include a PLC (Programmable Logic Controller), electrical and pneumatic components for automatically clamping the setup pallet, and/or for establishing/locking the media supply. Furthermore, it is possible that all required sensors for positioning and clamping the setup pallet 3 and for establishing/locking the media supply run together in this control cabinet 17. It can be provided to keep the interface to the test stand automatization system as small as possible, whereby also an autarkic operation without automatization system is possible.

In addition, a positioning gauge 14 or a fixing device 18 for the test component 70 can be arranged on the setup pallet 3, FIG. 2. The positioning gauge 14 serves for exactly aligning the test component 70 offside the test stand 1 with respect to the dyno in the test stand 1, e.g., by means of the receiving means 13. Moreover, the positioning gauge 14 allows not only the alignment of the test component 70 on the setup pallet 3, but facilitates advantageously also the alignment of the setup pallet 4 to the dynamometer during the initial startup. Advantageously, the positioning gauge 14 can be mounted on both sides of the setup pallet 3. The positioning gauge 14 is preferably configured in such a manner that different shaft heights of the dynamometer can be covered with only one positioning gauge 14. This ensures that the test component 70 in the test stand 1 is correctly positioned with the setup pallet 3.

In the setup area, the test component 70 is operated without load unit in order to check the function of the test component 70 or the sensor system, or to calibrate the measuring system. It can happen specifically in the case of diesel engines that the test component 70 sucks oil during the first start, in particular when testing prototypes, and a spinning of the test component 70 can occur. In order to prevent this, the fixing device 18 was designed which is connected to the output flange of the test component 70. For this purpose, the fixing device 18 can have matching flange adaptors. If a spinning of the test component 70 occurs, the vehicle coupling of the test component 70 is being closed and the test component 70 is stopped (virtually stalled). The fixing device 18 serves for preventing the test component 70 from spinning during the first test run and is of safety-related relevance in the setup area.

In the following, the function of the pallet system 2 according to the invention and the sequence of a setup procedure are described. The test stand 1 is first set up by installing therein the setup pallet receptacle 4 with its individual parts for receiving the setup pallet 3. The exact alignment of the setup pallet receptacle 4 can be adjusted, e.g., with the positioning gauge 14. In a setup area offside the test stand 1, a setup pallet 3 is preset by positioning and securing the test component 70, e.g. an internal combustion engine, an electric motor, a transmission or a drive train, on the receiving means 13, e.g. by means of the positioning gauge 14. The desired measuring system 72, e.g. sensors, can now be attached to the test component 70 and can be connected with suitable lines 73 to the signal conditioning units 22. Optionally, the test component 70 can already be filled in the setup area with oil media such as, e.g., oil, cooling water, etc. and the first simple test runs for checking the function of the test component 70 can be performed. Moreover, the entire measuring system 72 can already be calibrated in the setup area and can be checked with respect to its proper function.

The setup pallet 3 setup in this manner is now placed, e.g. by means of a forklift, into the test stand 1, where the setup pallet is deposited in the setup pallet receptacle 4 and is exactly brought in the correct position by means of the receptacle positioning devices 12 and the pallet positioning devices. Now, the holding devices 11 of the setup pallet 4 are activated, e.g. by pressing a button at the control cabinet 17 or by remote control from an operator station, and fix the setup pallet 3 in the setup pallet receptacle 4. Also, one or more movable docking plates 20, 64 is/are activated until the docking plates 20, 64 with their media connections 30, 32, 65, 66, locking mechanisms 33, 68, electrical connections and the locating means 31, 67 are engaged and thereby, the media supply, e.g. for oil, fuel, coolant, air and optionally the desired electrical connection is established. Also, the signal conditioning units 22 are connected to the test stand control 75, e.g. via a wire harness or via the electrical connections of the docking plates 20, 64. With that, the test stand 1 is ready for use and the desired program can be run. Removing the setup pallet 3 from the test stand 1 takes place substantially in reverse order.

The invention claimed is:

1. A pallet system with a setup pallet (3) for receiving a test component (70) and with a setup pallet receptacle (4), wherein a holding device (11) for holding the setup pallet (3) is provided on the setup pallet receptacle (4) and an associated fixture (61) for engaging the holding device (11) is provided on the setup pallet (3), and wherein a receptacle positioning device (12) is provided on the setup pallet receptacle (4) and a pallet positioning device is provided on the setup pallet (3), which positioning devices interact for correct positioning of the setup pallet (3) in the setup pallet receptacle (4), wherein a pallet docking plate (64) with a number of pallet media connections (65, 66) is provided on the setup pallet (3), and a receptacle docking unit (10) having a receptacle docking plate (20) with a number of matching receptacle media connections (30, 32) is provided on the setup pallet receptacle (4), wherein the pallet docking plate (64) and/or the receptacle docking plate (20) are/is arranged movably and a movable docking plate (20, 64) can be fed toward the other docking plate (64, 20) and thus, with the pallet media connections (65, 66) engaging in the receptacle media connections (30, 32), a media supply can be established, and the holding device (11), the receptacle positioning device (12) and the receptacle docking plate (20) can be positioned independently of one another and relative to one another.

2. The pallet system according to claim 1, wherein a guide means (35) for aligning the setup pallet (3) is provided on the setup pallet receptacle (4).

3. The pallet system according to claim 1, wherein the holding device (11) comprises a base frame (52) on which a support arm (51) is arranged in a swivelable and axially displaceable manner.

4. The pallet system according to claim 1, including receiving means (13) for holding and fixing the test component (70) in the correct position are arranged on the setup pallet (3).

5. The pallet system according to claim 1, wherein on the setup pallet (3), a signal conditioning unit (22) is provided which is connected via lines (73) to a measuring system (72) arranged on the test component (70).

6. The pallet system according to claim 1, wherein a positioning gauge (14) for aligning the test component (70) on the setup pallet (3) is arranged on the setup pallet (3).

7. The pallet system according to claim 1, wherein on the setup pallet (3), a fixing device (18) is provided which can be connected to the output flange of the test component (70).

8. A test stand with a pallet system according to claim 1, wherein a base plate (5) is arranged in the test stand (1) and the setup pallet (3) as well as the setup pallet receptacle (4) are arranged on the base plate (5).

9. The test stand according to claim 8, wherein a test stand control unit (75) is provided which is connected to the signal conditioning unit (22).

10. The test stand according to claim 8, wherein a control cabinet (17) is provided which controls and monitors the movable parts of the pallet system (2).

* * * * *